Jan. 5, 1965   W. H. KING, JR   3,164,004
COATED PIEZOELECTRIC ANALYZERS
Filed May 15. 1961   8 Sheets-Sheet 1

William H. King, Jr.   INVENTOR

BY *Richard H. Nagel*

PATENT ATTORNEY

Jan. 5, 1965 W. H. KING, JR 3,164,004
COATED PIEZOELECTRIC ANALYZERS
Filed May 15, 1961 8 Sheets-Sheet 2

William H. King, Jr. INVENTOR

BY Richard W. Nagel

PATENT ATTORNEY

Jan. 5, 1965  W. H. KING, JR  3,164,004
COATED PIEZOELECTRIC ANALYZERS
Filed May 15. 1961  8 Sheets-Sheet 3

William H. King, Jr.  INVENTOR

BY Richard H. Nagel

PATENT ATTORNEY

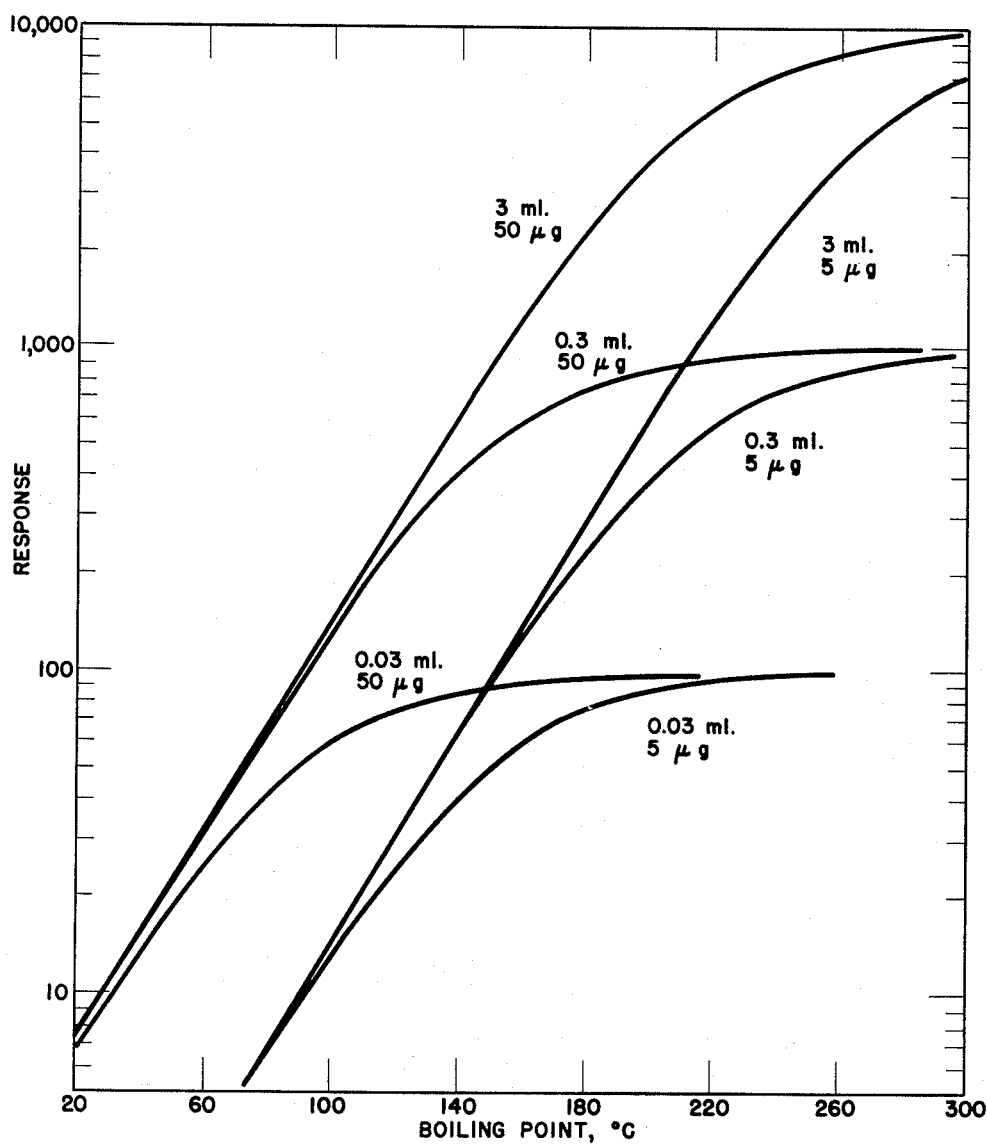

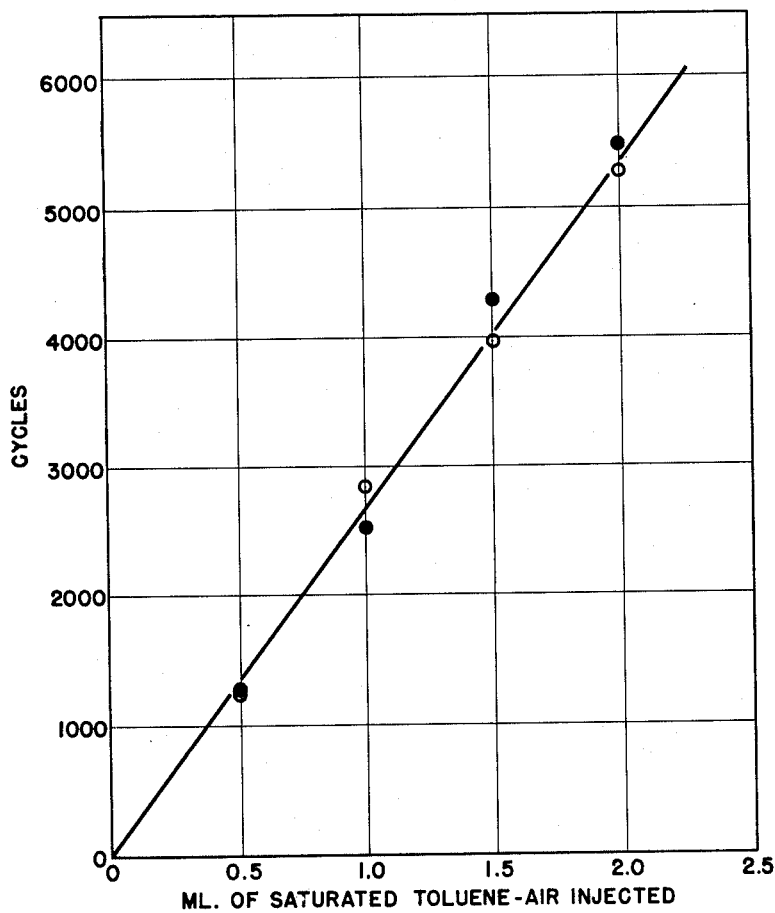

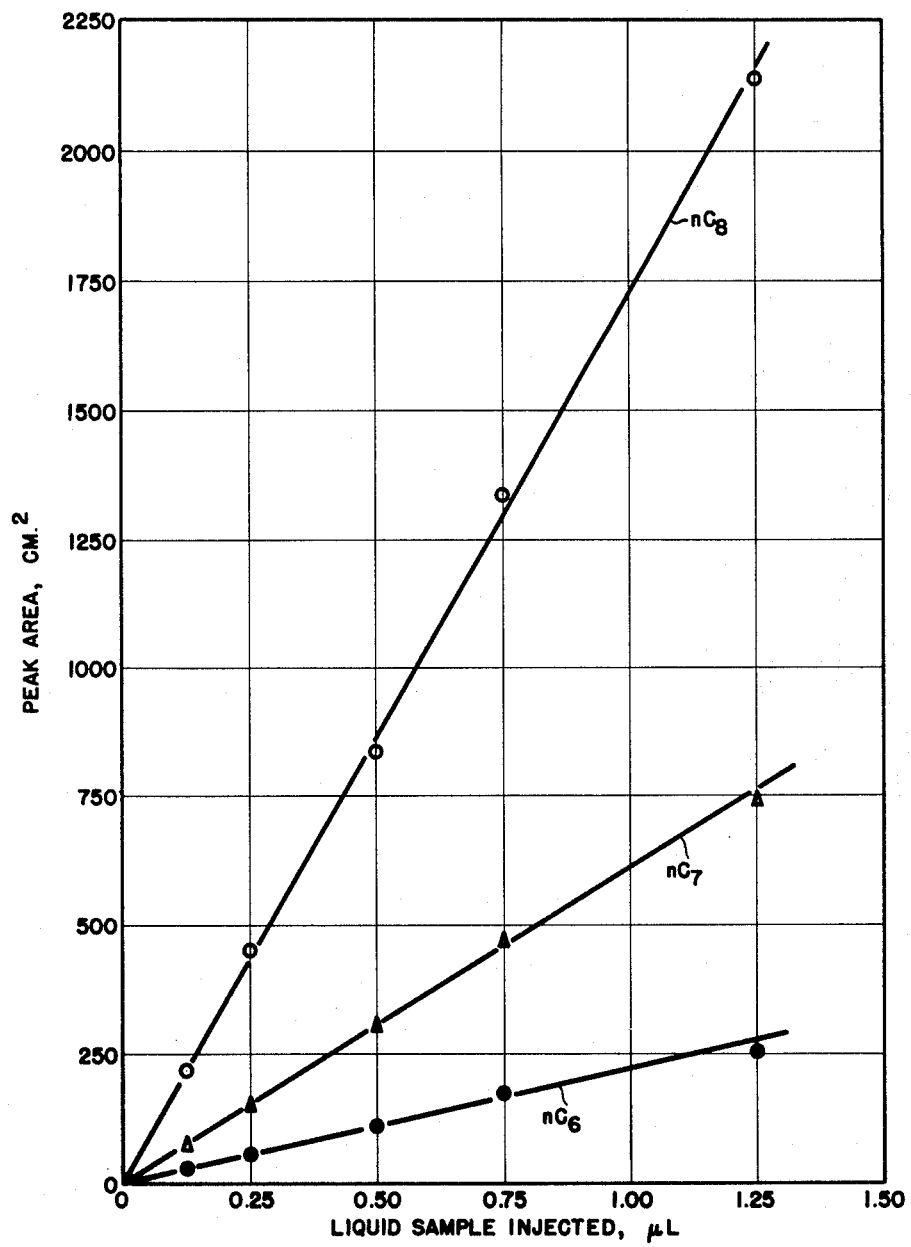

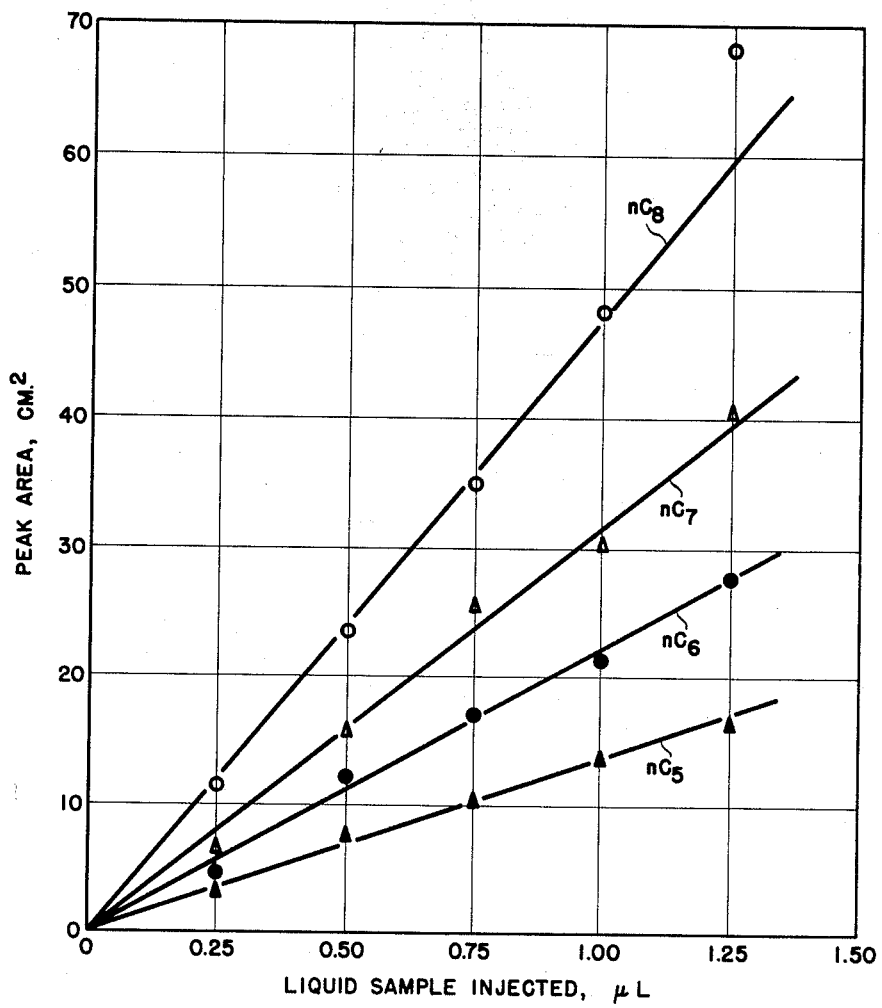

PEG DETECTOR

William H. King, Jr. INVENTOR

BY *Richard N. Nagel*

PATENT ATTORNEY

United States Patent Office 3,164,004
Patented Jan. 5, 1965

3,164,004
COATED PIEZOELECTRIC ANALYZERS
William H. King, Jr., Florham Park, N.J., assignor to Esso Research and Engineering Company, a corporation of Delaware
Filed May 15, 1961, Ser. No. 110,189
22 Claims. (Cl. 73—23)

This invention relates to a new and improved process and apparatus for the detection of gas compositions.

More specifically, this invention teaches the application of piezo-electric phenomena to the selective analysis of gaseous mixtures.

The selective detection of gas compositions is of great importance in industry. For example, in gas chromatography, it is necessary to determine the composition of the effluent. In addition, many simple analyzers have wide use, as in determining water in fuel; water and/or $H_2$ in powerformer feed; $CO_2$ in exhaust, flue gas, and carbon analysis; and $SO_2$ and $SO_3$ in sulfur analysis. Other areas of application include analysis of $H_2S$, aromatics, olefins, and paraffins. These uses are of particular interest in the petroleum industry. Other uses and applications of the instant invention will appear subsequently in the specification.

Briefly, the invention may be described as follows. It has been found that piezoelectric materials when coated with a substrate are sensitive to changes in their environment. For example, piezoelectric materials will exhibit different vibrational frequencies and amplitudes.

Though it was known in the prior art that the nature of the wave form emitted from these materials was dependent on their surroundings (see U.S. Patent 2,536,025) it was not possible to achieve the highly sensitive detection described herein. By selecting the appropriate substrate and the critical quantity to be coated on a piezoelectric material, it has been found that both qualitative and quantitave analyses hitherto impossible or extremely difficult to perform can be readily achieved. For example, the detector of the instant invention is capable of detecting weight changes in the order of one billionth of a gram.

Figure 1:
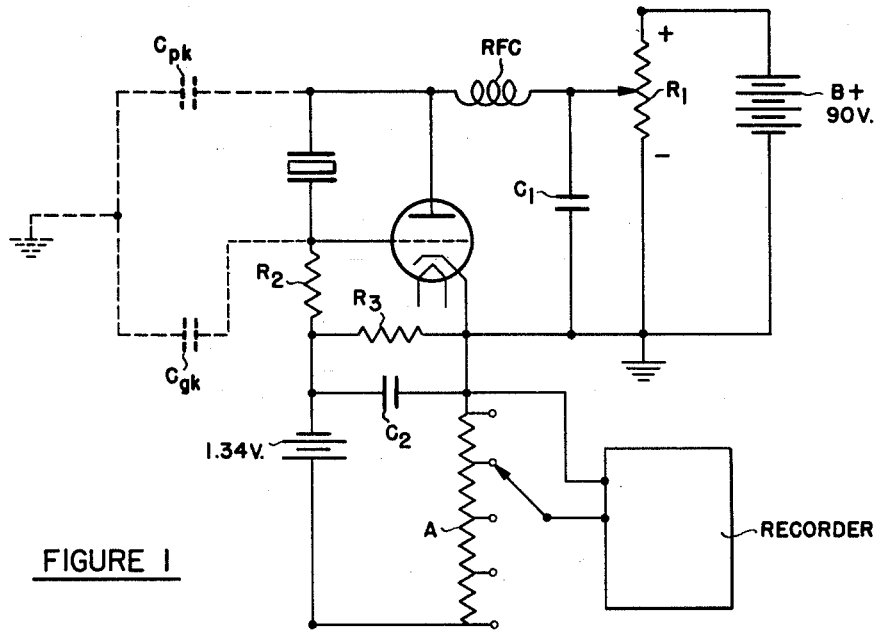
Figure 2:
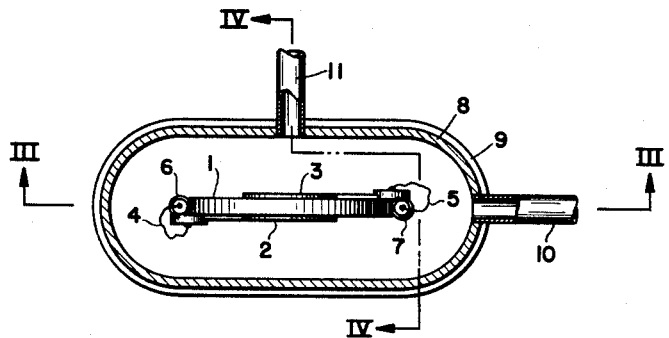
Figure 3:
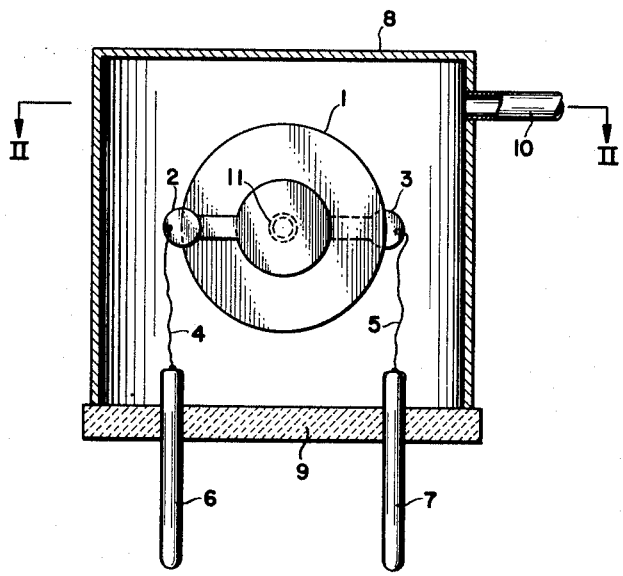
Figure 4:
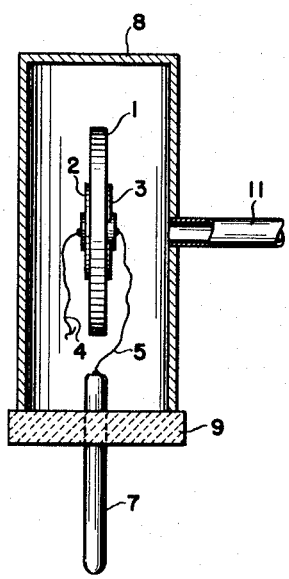
Figure 5:
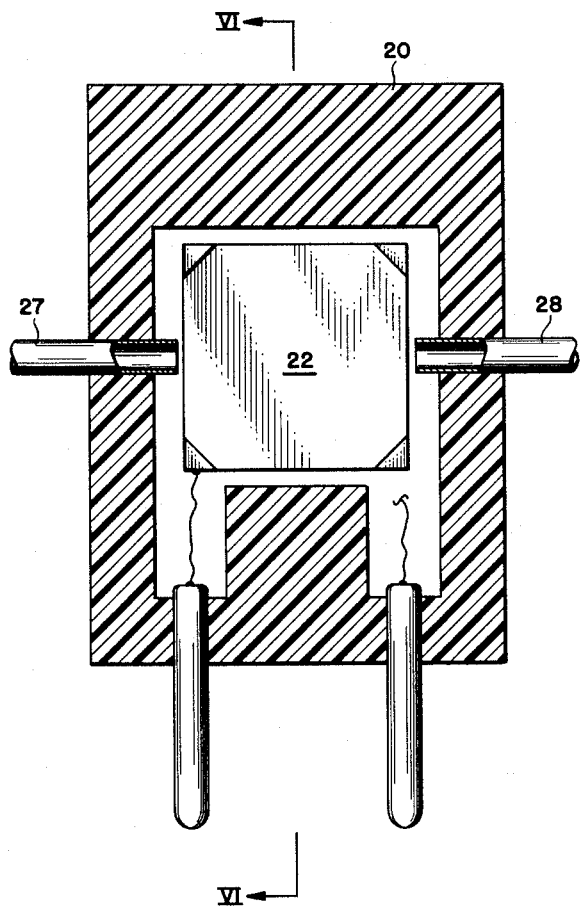
Figure 6:
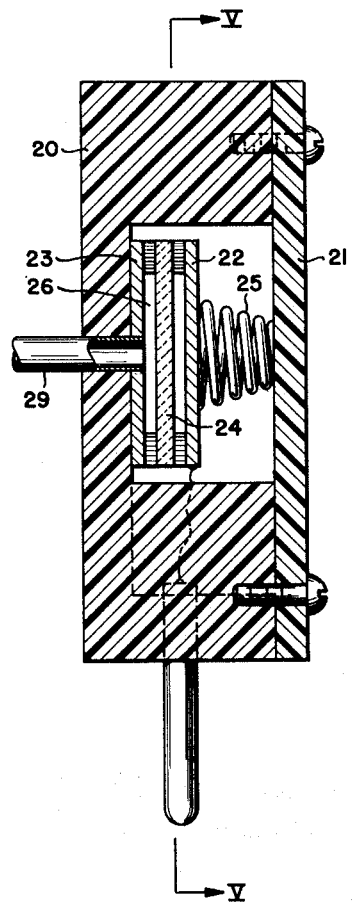

A better understanding of the instant invention may be achieved with reference to the attached figures. FIGURE 1 illustrates a schematic of a typical crystal oscillator detector circuit. FIGURES 2, 3 and 4 are top, front and side views of a typical metal plated electrode 9 megacycle crystal in its metal case. FIGURES 5 and 6 show front and side cross sections, respectively, of a pressure mounted, corner clamped crystal used as a low volume detector. FIGURES 7 through 13 represent various response characteristics of detectors in accordance with specific examples given below.

Turning now to FIGURE 1, there is depicted a specific embodiment of a typical oscillator circuit which may be used in accordance with the instant invention. Specifically, this circuit is a Pierce oscillator which is essentially a Colpitts oscillator having inductance-capacitance tank circuit replaced by the quartz crystal. B+ voltage is applied across the cathode and the plate of the triode. The value may be adjusted by varying the potentiometer R–1 so as to obtain approximately 1.34 volts across R–3. This voltage opposes the mercury cell resulting in zero potential to the recorder. Thus, the recorder measures a signal proportional to the changes in the grid bias. This grid bias directly reflects changes in amplitude of vibration of the crystal. The radio frequency choke (RFC) and the capacity C–1 prevent the radio frequency current from entering the direct current power supply. Capacity C–2 keeps the radio frequency signal out of the recorder. The crystal is connected directly between the grid and the plate, and the amount of feedback is dependent on the interelectrode and stray capacitances between the grid and the cathode and the properties of the crystal. This feedback and the setting of R–1 determine the amplitude of vibration of the crystal. The plate to cathode capacitance is shown in the circuit by means of dotted lines. Resistors R–2 and R–3 serve as the grid leak bias. The 10 millivolt recorder (connected to attenuator A) observes only changes in the amplitude of vibration.

In the event that it is desirable to measure changes in the frequency of vibration, other appropriate circuits well known in the art may be employed. In addition, it should be emphasized that the particular type of oscillator circuit within which the crystal is placed is not critical. There are many such oscillators which may be used, for example, the Hartley oscillator and its many modifications, the tuned grid tuned plate oscillator, the Dynatron oscillator, the transition oscillator, and many forms of other feedback oscillators. The choice of the oscillator depends on the particular stability requirements and naturally affects the sensitivity of the detection apparatus. The necessary modifications of oscillator circuits required to secure high efficiency and stability are well within the knowledge of those skilled in the art.

FIGURES 2, 3 and 4 show cross sectional views of a particular housing which may be used in the instant invention. The crystal which is about 1.2 centimeters in diameter and about 0.016 centimeter thick quartz is represented on the drawings by the numeral 1. The electrodes contact opposite faces of the crystal and are represented by numerals 2 and 3. Wires 4 and 5 connect the electrodes to pins 6 and 7, respectively. These pins serve to connect the crystal to the particular oscillator circuit. The crystal and electrodes are sealed within housing 8. This housing has a volume of about 2.5 ml. and is sealed at the base by ceramic insulator 9. The outside dimensions of the housing are 18.5 mm. in width, 8 mm. in depth, and 17.5 mm. in height. The pins 6 and 7 have an outside diameter of 0.05 inch and are spaced 0.486 inch apart. A gas inlet 10 is provided and an outlet 11 for circulating the particular gas which is to be analyzed. The particular material which the housing 8 is composed of can be any of numerous materials so long as it is unreactive with the gaseous composition to be passed therethrough and is capable of making the enclosure airtight as to the outside atmosphere.

FIGURES 5 and 6 illustrate a front and side section of a pressure mounted corner clamped crystal used for low volume detectors. These detectors are particularly useful in kinetic studies as will be brought out subsequently. The unit is essentially composed of a Bakelite holder 20 and a front cover 21 fastened thereto. Within the area bounded by the holder 20 and the cover 21 are located a front and rear electrode 22 and 23, respectively, and a quartz crystal 24. The two electrodes sandwich the crystal and are held in place by a spring 25. The volume of the detector is that area between the electrode 23 and the crystal and indicated by the numeral 26. The external dimensions of the Bakelite holder are width, 20.7 mm.; depth, 11 mm.; and height, 28.8 mm. Rear and side gas tubes are indicated by the numerals 27, 28 and 29.

While the above units for containing the crystal have been found satisfactory for application in the instant invention, it should be clear that many modifications may be employed. Briefly, the only factors necessary to be considered here are that the responsive material be provided with electrodes and that an area be defined wherein the gas to be analyzed may be confined without danger of dilution to the outside atmosphere.

The particular "responsive material" which may be employed in accordance with this invention is defined as any material which exhibits piezoelectric properties.

The material exhibits piezoelectric properties if, when subject to mechanical pressure, it develops an electrical potential and vice versa, when subject to an electrical potential, it mechanically deforms. Several such materials are known, for example, crystals such as quartz, tourmaline, and Rochelle salts and other materials such as barium titanate. Quartz is the particular crystal most often employed in electrical applications, but the instant invention is not to be limited thereto.

The particular frequency at which the material oscillates is dependent on several factors, for example, the thickness of the material and, in the case of crystals, the particular axis which it was cut along; the electrode structure; the characteristics of the associated circuit; temperature; etc. If it is desirable to have a circuit of extremely high stability, it is often advantageous to maintain the responsive material and its associate parts in a thermostatically controlled oven. In the application of the instant invention, the temperature of the gaseous composition to be analyzed must be considered so as not to adversely affect the temperature of the crystal.

"Substrate" as used in the instant invention shall be taken to mean any thin film or coating deposited in predetermined quantity on the responsive material. The substrate may be either liquid or solid.

The particular substrate employed depends on the function which it must serve. For most practical applications, it should have a reasonably long residence time on the surface of the responsive material. Hence, a low vapor pressure material is desirable, but not absolutely necessary since the substrate may easily be replaced.

Of course, the substrate must have the ability to "interact" with the particular gaseous composition to be detected. The term "interact" as used herein shall be defined to include both chemical and physical phenomena. For example, the gas to be analyzed may react chemically with the substrate or be adsorbed or absorbed therein.

Where the detection is selective for a particular component of the gaseous composition, it is the interaction of the particular constituents with the substrate that effects amplitude and frequency of the vibrating responsive material. Examples of the substrates which would be selected for particular operations are as follows:

| Compounds to be Detected | Substrate |
|---|---|
| Hydrocarbons Non-Selective to Compound Type. | Squalane. Silicon Oil. Apiezon Grease. |
| Aromatics Selectively | B-B'-oxydipropionitrile. Sulfolane. Polyethylene Glycol-400. |
| Oxygenated Compounds | Dinonyl phthalate. Tide (alkyl sulfonate). Aldol-40. |
| Unsaturated Compounds | Glycerol plus AgNO₃. Sulfolane. |
| H₂O | Silica gel. Molecular sieves. Alumina, etc. |
| H₂S | Lead Acetate. Silver Metal. Copper Metal. Anthraquinone-disulphonic Acid. |

The amount of substrate employed is a significant variable in the invention. As will be shown later, its volume in relation to the volume of the crystal and its weight are of particular importance in determining the response of the detector.

The amount of substrate used generally covers the range 1 to 100 micrograms per square centimeter. Larger amounts can be used but difficulty is then often encountered in maintaining the responsive material in a condition of stable oscillation. The more the substrate, the higher the sensitivity, but stability and time constant become problems. Therefore, the amount is chosen experimentally for best compromise. With squalane substrate, satisfactory performance is obtained with 5 to 50 micrograms per square centimeter. The substrate is coated on the responsive material so as to form a thin film. It is desirable to evenly coat the surface so as to properly activate the material.

The method of coating the responsive materials is not critical provided the responsive material remains undamaged after coating. It must oscillate with the coating applied. With liquid, a typical procedure is as follows. Using a microsyringe, a few microliters of a solution of substrate in a volatile solvent are dropped on the surface of the responsive material. When the solvent evaporates, the substrate spreads out slowly and covers the surface uniformly. With squalane, this occurs in 2 or 3 days depending on the temperature. Sixteen hours in an oven at 150° F. will also result in an even coating for squalane. Silicone oil (DC-200) is very viscous, but when heated 16 hours at 250° F. uniform coatings are obtained. The time for creeping of liquid substrates is a function of the substrate and the practical waiting time.

Solid substrates of many forms can be applied with cement. Some very fine powders or crystals may be deposited from solutions or suspensions. If the solid is a metal oxide, it is convenient to make the plated electrodes from the desired metal and then convert the surface metal to the oxide form. In addition, many other techniques could be devised by one skilled in the art.

The response of the detector is determined by the weight of the substrate, the specific retention volume of the substrate and the total volume of the detector. The following formulae approximately describe the detector response and time constant when the amplitude mode of operation is used.

$$(1) \quad R = K \frac{WVg}{V + WVg}$$

$$(2) \quad T.C. = \frac{V + WVg}{F}$$

$R$ = Response in percent change in grid current per mole percent solute in carrier gas (percent $\Delta$ I per mole percent
T.C. = Time constant in seconds
$K$ = Proportionality factor (usually about 1000)
$W$ = Weight of substrate in grams
$Vg$ = Specific retention volume in ml./gm.
$V$ = Volume of detector in ml.
$F$ = Flow rate of carrier gas in ml./sec.

In order to more fully describe the instant invention, the following examples are set forth.

*Example 1*

Figure 7:
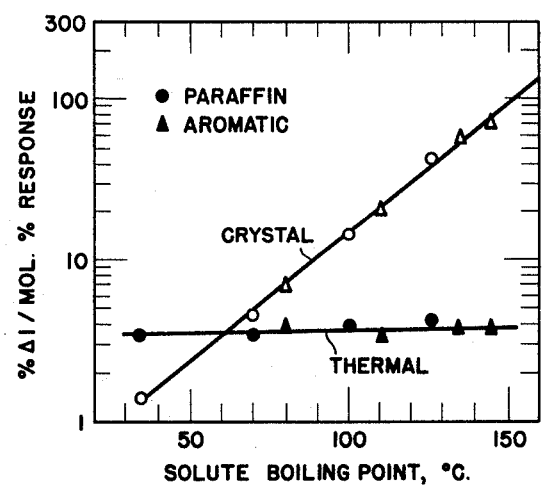

In this experiment, gas chromatography was used. The gas chromatography unit consisted of a ¼" O.D. by 18" long tube containing 3% squalane on chromosorb-P. Helium and air were used as carrier gases. The flow rates were from 0.3 to 3 ml. per second. Blends of paraffins and aromatics boiling from 30° to 150° C. were used as standard samples. The detector volume was 0.30 ml. and the crystal was coated with 5 micrograms of squalane. The coating was formed as previously described. The detector temperature was always at room (78° F.) temperature. The blended samples were injected by microsyringes through a rubber septum in front of the column. A Perkin-Elmer thermal conductivity detector in series with the squalane coated crystal detector was used to obtain comparative data. The results are shown in FIGURE 7. This figure shows that the thermal conductivity detector sensitivity is essentially independent of the boiling point of the sample. On the other hand, the squalane crystal detector improves its sensitivity exponentially with boiling point. It is, therefore, clear that the detector of the instant invention can be used to determine boiling point difference wherein the thermal conductivity detector is entirely inadequate. Further-more, it is shown that the new detector is more sensitive than the thermal conductivity detector for materials boiling above about 60° C., i.e. normal hexane.

*Example 2*

FIGURE 8 shows the interaction of various parameters in detector design. Specifically, calculated responses of squalane coated quartz crystals are shown indicating variations in response with various detector volumes and coatings. Fifty and five microgram squalane coatings were employed with 0.03, 0.3 and 3 ml. of detector volumes. This figure indicates that if high selectivity is not important in a particular application, the large volume of heavy substrate detector may be used, while if response speed is important, a small detector is preferable.

*Example 3*

Another advantage of the instant invention is that the selectivity and sensitivity of the detector is unaffected by the particular carrier gas used. The use of heavier gases improves the resolving power of gas chromatography and hence is desirable. In addition, heavy carrier gases are often less expensive. The table below shows that the sensitivity of the detector wherein air is used as a carrier gas is about equal to that where helium is employed.

| ½μ L Sample | Helium | | Air | |
| --- | --- | --- | --- | --- |
|  | Peak Area, Cm.² | Sec.[1] | Peak Area, Cm.² | Sec.[1] |
| n-Pentane | 112 | (22) | 120 | (20) |
| Benzene | 588 | (48) | 596 | (44) |
| Toluene | 1,856 | (110) | 1,968 | (100) |
| o-Xylene | 5,388 | (317) | 5,888 | (287) |

[1] ( ) value is retention time in 180 plate column, gas flow rate 38 cc./min. Peak area × 0.35 equals percent change in grid current times seconds. Data for 9 mc. gold plated crystal with squalane substrate.

The density change from helium to air is great; and, therefore, this is a very sensitive test on the effect of carrier gas on sensitivity. As long as the carrier gas does not partition with the substrate, selectivity is not influenced.

*Example 4*

In this example it is further illustrated that the detector of the instant invention ignores nonpartitionable gases. In this instance, the frequency change of the coated crystal was measured. A 9 megacycle crystal activated with 4 micrograms of squalane was used. A Perkin-Elmer thermistor thermal conductivity detector was used for comparison. The following data were obtained.

| Sample | New Detector | | Thermal Conductivity, Percent ΔI/ Percent [2] |
| --- | --- | --- | --- |
|  | ΔF/ Percent [1] | Percent ΔI/ Percent [2] |  |
| 30 Mole Percent Air | 0.0 | 0.51 | 1.10 |
| 2 Mole Percent Toluene | 830 | 17.6 | 3.20 |

[1] Cycles per second change in frequency per mole percent gas in helium carrier.
[2] Percent change in grid current per mole percent gas.

The data show no response to a change in gas density from helium to 30 mole percent air when the frequency change mode of detection is used.

The fact that the carrier gas composition can be ignored is important to many continuous analyzer problems and will be applicable to detecting small amounts of partitionable gases in large amounts of nonpartitionable gas whose composition changes.

*Example 5*

To show that outstanding linearity is obtained when using the detector of the instant invention, the following experiments were made. Liquid samples of from 0.25 to 1.25 microliters were injected into the chromatograph and the responses of squalane and polyethylene glycol-600 detectors were measured. FIGURE 9 shows the frequency change plotted versus the ml. of saturated toluene-air gas samples injected into the chromatograph. FIGURE 10 shows the same detector employing samples of normal hexane, normal heptane and normal octane. FIGURE 11 shows linearity with the polyethylene glycol-600 detector. The compounds used were xylene, normal pentane, toluene and benzene. Statistical analysis over the range of from 0.5 to 5 microliters shows that the linearity of the detector of the instant invention is as good as that normally obtained with thermal conductivity detectors.

*Example 6*

Figure 12:
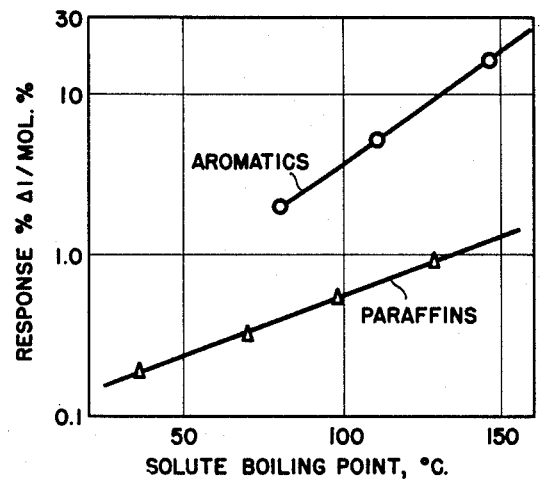
Figure 13:
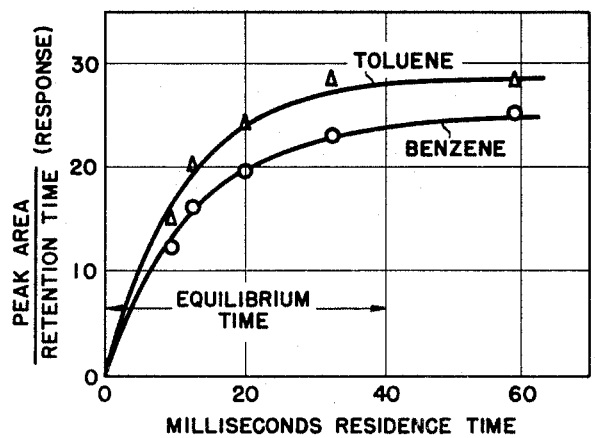

Still another advantage of the instant invention is that the detector can be made selective to a particular type of gaseous compound. FIGURE 12 shows data obtained when measured blends of paraffins and aromatics were analyzed with a 9 megacycle polyethylene glycol-600 gold plated crystal.

The selectivity feature of the detector will be important to devising new types of simple nondispersion analyzers. For example, a detector selective to water was made by coating $H_3PO_4$ on a crystal. The detector was insensitive to gas composition changes with the exception of water. Preliminary data show that trace level water in air and many other gases can be detected with this device. Certainly, other materials could be used for water detection with improved performance and selectivity, for example, 4 A. sieves, ion exchange resins, and $P_2O_5$.

Simple continuous analyzers which use two detectors containing two different substrates selective to paraffins and aromatics are within the scope of the instant invention. The relative output of the two detectors is a measure of the relative partition coefficients. Used in this way, aromatics can be detected in the presence of paraffin materials. In other words, the detector will produce an output signal only when aromatics are present. Other analyzers using this principle are, of course, possible.

*Example 7*

The instant invention also has applicability in studying kinetics of various systems since the detector response speed is extremely high. For example, by using an extremely small volume detector such as that illustrated in FIGURES 5 and 6, the time for the sample to come to equilibrium can be measured. This is shown by the following experiment. Samples of benzene and toluene were injected into a gas chromatograph over a wide range of gas flow rates. Since the volume of the detector is only .02 cc., the residence time of the gas in the detector was in the order of milliseconds. If the solute substrate came to equilibrium instantaneously, then the peak area divided by the residence time from air would be a constant. However, in fact, time is required to come to equilibrium. This is clearly shown in FIGURE 13. The data show that approximately 40 milliseconds are required to obtain equilibrium. This clearly illustrates that the method outlined here shows that the new detector can be used to study physical and chemical kinetics of various systems. For example, if the rate or amount of reaction between a gas and solid were desired, the solid is placed on the crystal and its weight changes observed as a function of time or gas pressure.

What is claimed is:

1. An analyzer which comprises in combination a housing, inlet and outlet means adapted to permit gas flow through said housing, a piezoelectric material mounted within said housing, an electronic oscillator circuit means which is controlled by said piezoelectric material, a substrate coated on said piezoelectric material, said substrate being adapted to interact with at least one component of a gas to be analyzed, means for oscillating said piezoelectric material, and means for detecting changes in the oscillations of said circuit.

2. The analyzer of claim 1 wherein said piezoelectric material is quartz.

3. An apparatus for analyzing the composition of a gaseous stream which comprises in combination, an electronic oscillator circuit having a vibratable piezoelectric material as a control element thereof, means for flowing a gaseous stream in contact with said piezoelectric material, substrate means coated on said material for interacting with at least one component of said gaseous stream so as to change the oscillation of said oscillator means and means for detecting changes in said oscillation.

4. An apparatus according to claim 3 wherein said means for detecting changes in said oscillation is a recording device.

5. The apparatus of claim 3 wherein said piezoelectric material is quartz.

6. The apparatus of claim 3 wherein said gaseous stream is composed of hydrocarbons and said liquid substrate is selected from the group consisting of squalane, silicone oil and Apiezon grease.

7. The apparatus of claim 3 wherein said gaseous stream contains aromatics and the liquid substrate is selected from the group consisting of B,B'-oxy dipropionitrile, sulfolane, and polyethylene glycol.

8. The apparatus of claim 3 wherein said gaseous stream contains oxygenated compounds and said substrate consists of dinonyl phthalate, alkyl sulfonate, and Aldol-40.

9. The apparatus of claim 3 wherein said gaseous stream contains water and said substrate is selected from the group consisting of silica gel, alumina and molecular sieves.

10. The apparatus of claim 3 wherein said gaseous material contains hydrogen sulfide and said substrate is composed of a material selected from the group consisting of lead acetate, silver, copper, and anthraquinone disulfonic acid.

11. An apparatus for analyzing a fluid stream which comprises in combination electronic oscillator means having a vibratable piezoelectric material as a control element thereof, means for flowing a fluid stream in contact with said material, substrate means coated on said material for interacting with at least one component of said fluid stream so as to change the oscillation of said electronic oscillator means, and means for detecting changes in said oscillation.

12. An apparatus according to claim 11 where in said means for detecting changes in said oscillation is a recording device.

13. An apparatus according to claim 11 wherein said fluid stream is liquid and said means for flowing a fluid stream in contact with said piezoelectric material is a means for flowing a liquid stream in contact with said responsive material.

14. The apparatus of claim 11 wherein said responsive material is a piezoelectric crystal.

15. The apparatus of claim 14 wherein said piezoelectric material is a quartz piezoelectric crystal.

16. An analyzer comprising in combination an electronic circuit oscillator means, having a coated, vibratable, piezoelectric material as a resonant element therein, the coating of said piezoelectric material being adapted to interact with at least one component of a fluid to be analyzed and whereby as a result of said interaction the oscillation of said circuit is changed, and means for detecting changes in the oscillation of said circuit.

17. The device of claim 16 wherein said responsive material is a quartz crystal and said coating is a liquid.

18. In an analyzer comprising in combination an electronic circuit oscillator means having a vibratable piezoelectric element as a resonant element thereof, and means for detecting changes in the oscillation of said oscillator circuit, the improvement wherein said piezoelectric element has a substrate coated thereon and wherein said substrate can interact with at least one component of a material to be analyzed.

19. The device of claim 18 wherein said responsive material is a quartz piezoelectric crystal.

20. The apparatus of claim 18 wherein said substrate is selected from the group consisting of squalane, silicone oil, Apiezon grease, B,B'-oxy dipropionitrile, sulfolane, polyethylene glycol, dinonyl phthalate, sulfonate, Aldol-40, silica gel, alumina, molecular sieves, lead acetate, silver, copper, and anthraquinone disulfonic acid.

21. In an electronic oscillator circuit having a vibratable piezoelectric material as a resonant element thereof, the improvement which permits said circuit to be used as an analyzer wherein said piezoelectric element is coated with a substrate capable of interacting with at least one component of a material to be analyzed, whereby as a result of said interaction the oscillation of said circuit is changed and means for detecting said change in oscillation.

22. The apparatus of claim 21 wherein said piezoelectric material is a quartz crystal.

References Cited in the file of this patent

UNITED STATES PATENTS

| | | |
|---|---|---|
| 1,559,461 | Ruben | Oct. 27, 1925 |
| 2,571,171 | Van Dyke | Oct. 16, 1951 |
| 2,740,032 | Bouyoucos | Mar. 27, 1956 |
| 2,857,532 | Ziegler | Oct. 21, 1958 |
| 2,937,524 | Gregor | May 24, 1960 |

OTHER REFERENCES

Book, Gas Chromatography Abstracts, 1959, Butterworths Scientific Publications, London, pages 142–149.